Figure 1:
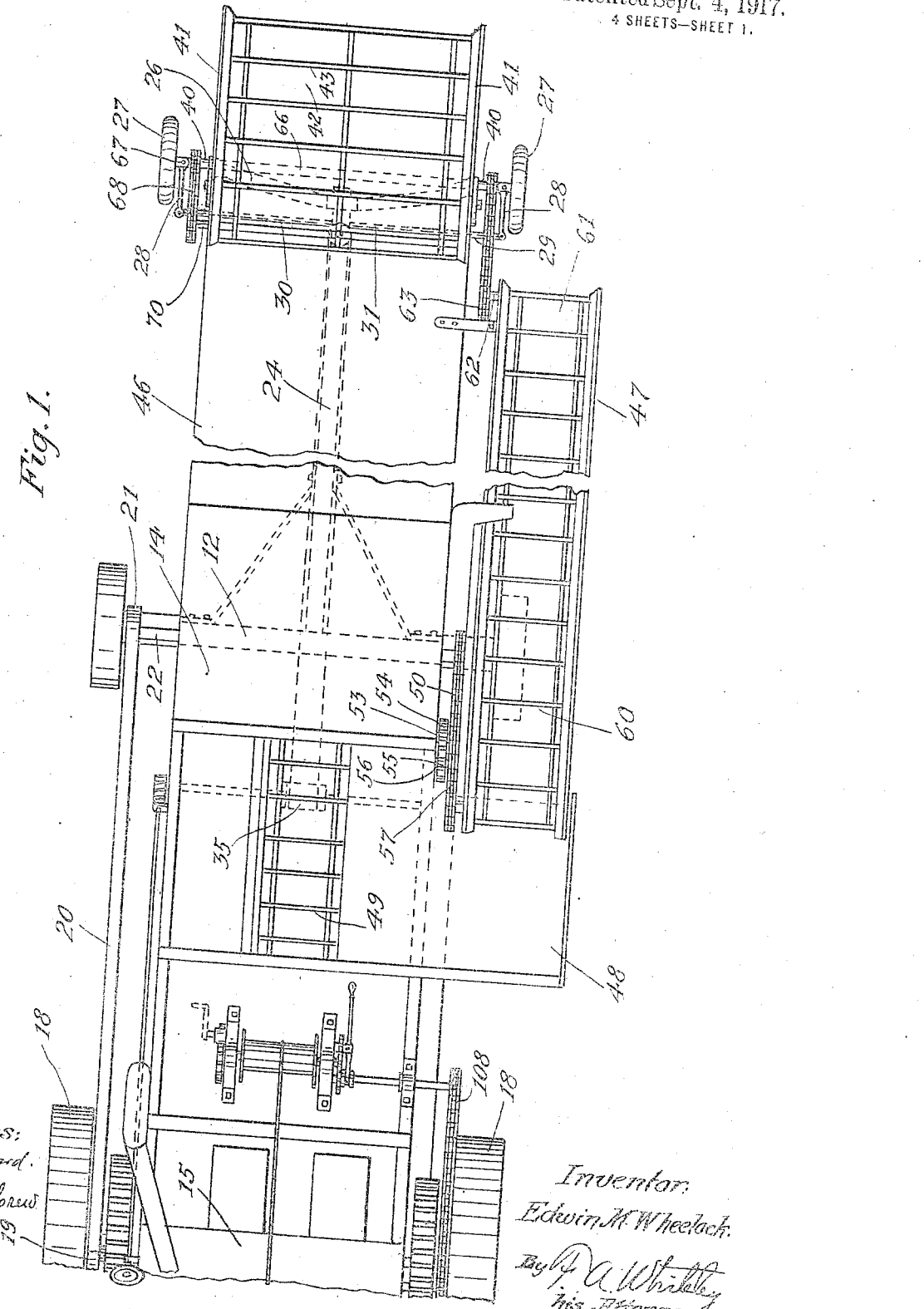

UNITED STATES PATENT OFFICE.

EDWIN M. WHEELOCK, OF WINONA, MINNESOTA.

AUTOMATIC SHOCK-THRESHING MACHINE.

1,238,970.  Specification of Letters Patent.  Patented Sept. 4, 1917.

Application filed May 20, 1912, Serial No. 698,651. Renewed January 29, 1917. Serial No. 145,307.

*To all whom it may concern:*

Be it known that I, EDWIN M. WHEELOCK, a citizen of the United States, residing at Winona, in the county of Winona and State of Minnesota, have invented certain new and useful Improvements in Automatic Shock-Threshing Machines, of which the following is a specification.

My invention relates to automatic shock threshing machines, and has for its object to provide a separator outfit having the motor for operating and propelling the same self-contained in combination with a traveling shock gathering device which shall lift the bundles of grain from the shocks on to a platform from which they may be transferred by hand to an elevating conveyer and from thence delivered to the self feeder of the threshing machine.

It is the chief object of my invention to provide a machine of the above character in which the entire operations of handling and separating the grain from the straw may be accomplished while the grain is in the shock by an outfit which will require but few operatives to run. The grain will have to be handled only once and that will be to place the bundles upon the conveyer which elevates the same to the feeder, the bundles being automatically picked up from the shocks and delivered to said platform. The entire power for operating the threshing machine and shock loader and elevator as well as propelling the apparatus through the field is derived from a motor carried directly on the threshing frame.

It is an object of my invention to so construct the shock loader that it may be mounted in front of the traction thresher and the wheels thereof operate to steer the entire apparatus, and thus, as the machine proceeds across the field, it may be caused to travel in a more or less irregular path successively to approach different shocks and receive and deliver the same upon a platform moving with the shock loader, from which an operative will transfer the bundles one at a time to a carrier for moving the bundles to the feeder. The straw will be thrown out back of the separator scattering over the ground where it can be readily plowed in to act as fertilizer and the grain will be handled by an elevating weigher of well known construction from which it will run to a grain tank drawn behind the outfit.

The present system of shock threshing requires that the separator shall be set up at some convenient point, and the shocks loaded upon wagons and the grain bundles thereby transported to the separator. Where the loading of the shocks is done by hand, a considerable number of pitchers are employed and always there will need to be six or seven teams hauling the bundles to the separator. Efforts have been made to devise machines for loading the shocks onto the wagons without the use of a pitcher, and some of these machines have been fairly successful. The use of shock loaders for such purposes, however, does not materially reduce the labor involved in shock threshing, merely doing away with a few pitchers and not at all with teamsters or horses and, in fact, increasing the amount of horse power required. It has also been proposed to provide movable separators having a power plant self contained, that is, the motor for driving the separator mechanism being mounted on the frame of the separator and having means for clutching the same to traction wheels for propelling the separator through the field. In using this type of separator, it is designed to make more stands in a field so that the bundles will not need to be hauled so far, but the separator does not operate while in motion and the bundles must, as before, be loaded upon wagons and drawn to the separator.

It will be seen, therefore, that the primary object of my invention is to provide a separator which, in its entirety, goes to the bundles in place in the shocks, operates to pick them up, and performs the operation of separating the grain from the straw while the separator is in motion. It is, of course, proposed to employ a motor of the explosive engine type, and to operate a device such as is outlined herein, but two men will be required, one to run the engine and steer the combined separator and shock loader and the other to handle the bundles upon the platform of the shock loader. The only teams which will be needed would be those required to haul the grain to the warehouse or elevator.

The full objects and advantages of my invention will appear in connection with the detailed description thereof, and are particularly pointed out in the claims.

In the drawings illustrating an application of my invention,—

Figure 2:
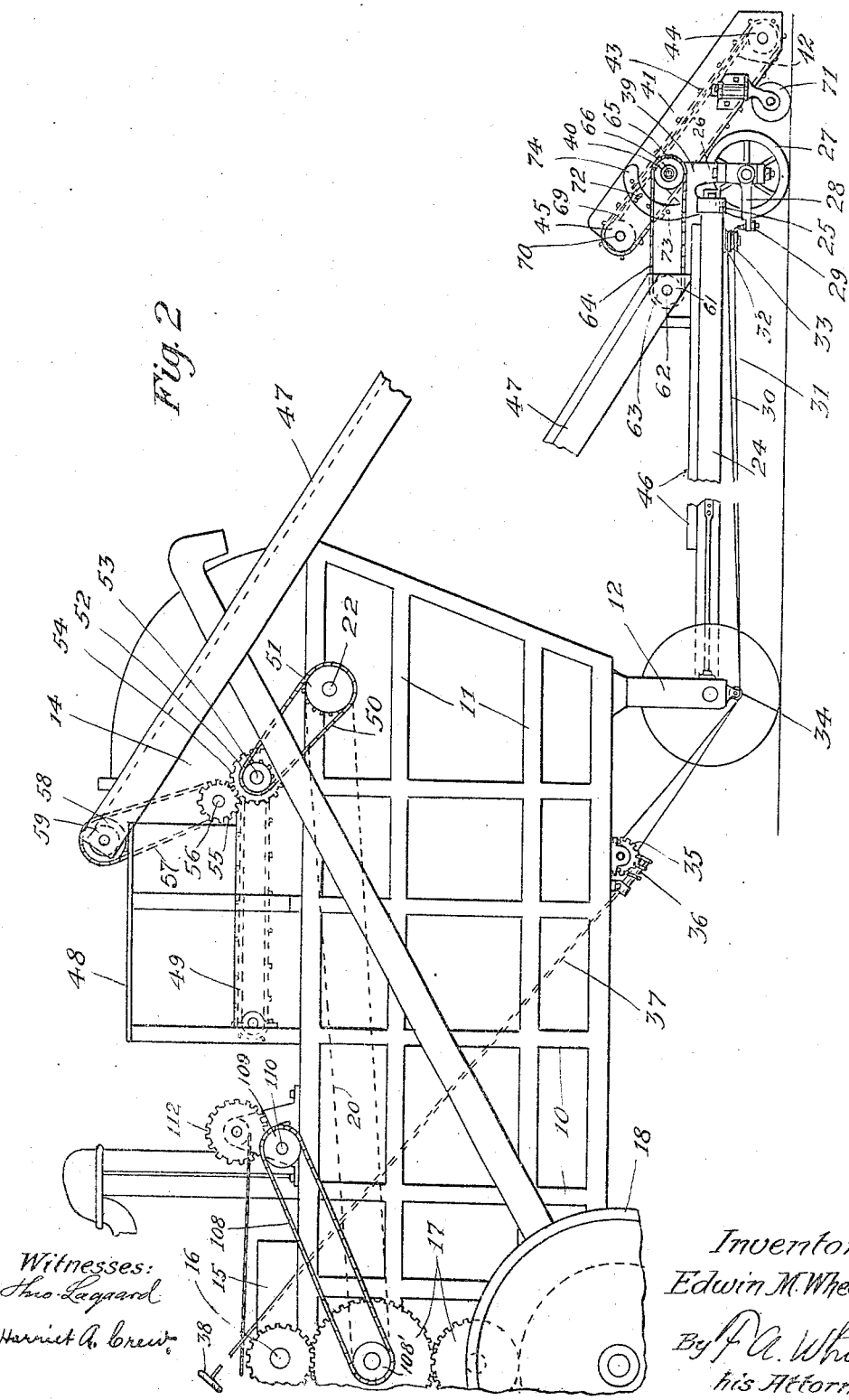
Figure 3:
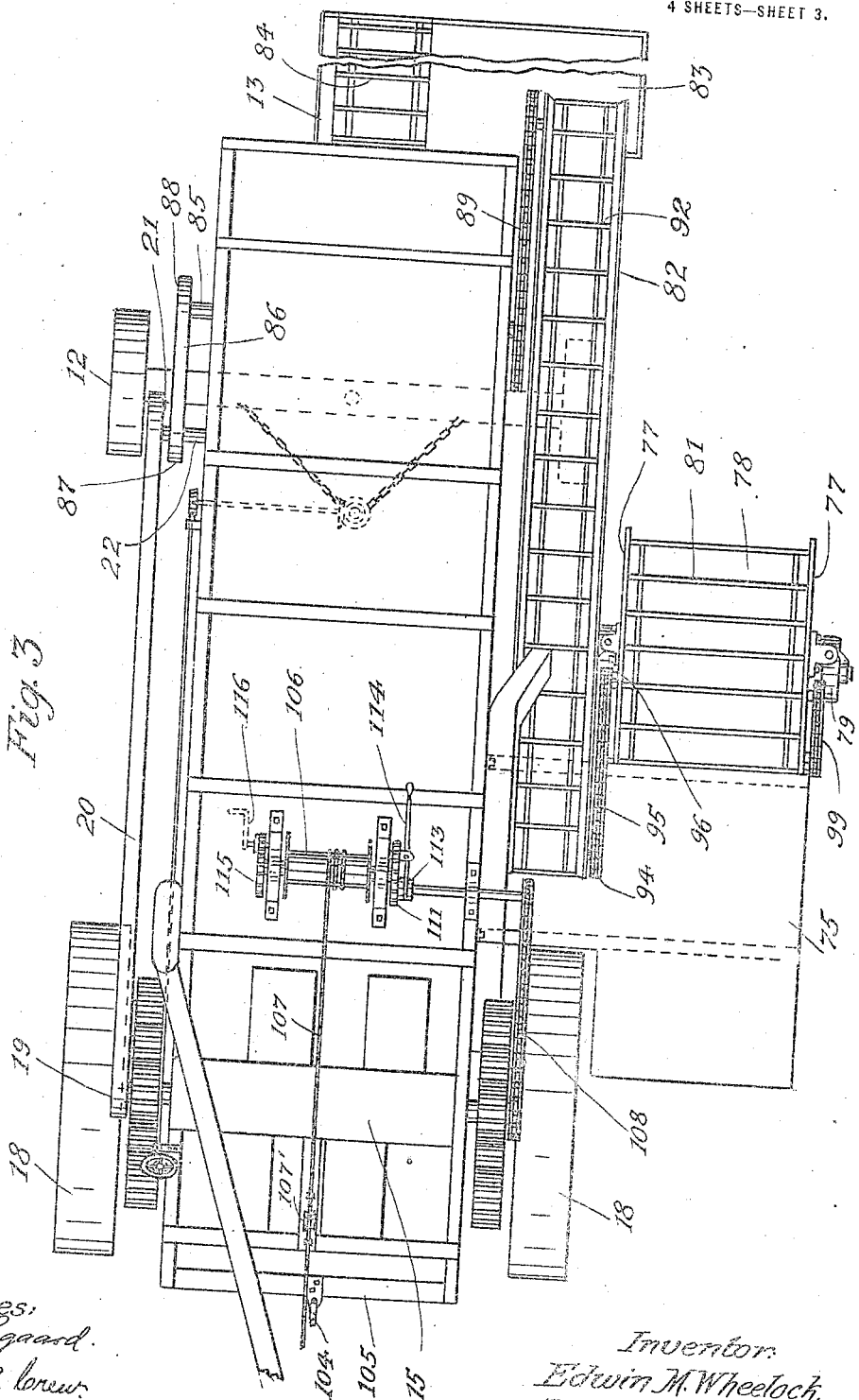

Figure 1 is a plan and Fig. 2 a side elevation of my combined loading separator in which the loading mechanism runs in advance of the separator and the separator is steered thereby. Fig. 3 is a plan and Fig. 4 a side elevation of the parts shown in Figs. 1 and 2, with the shock loader running at the side of the separator and adapted to deliver bundles to a front feeder of well known construction.

Figure 4:
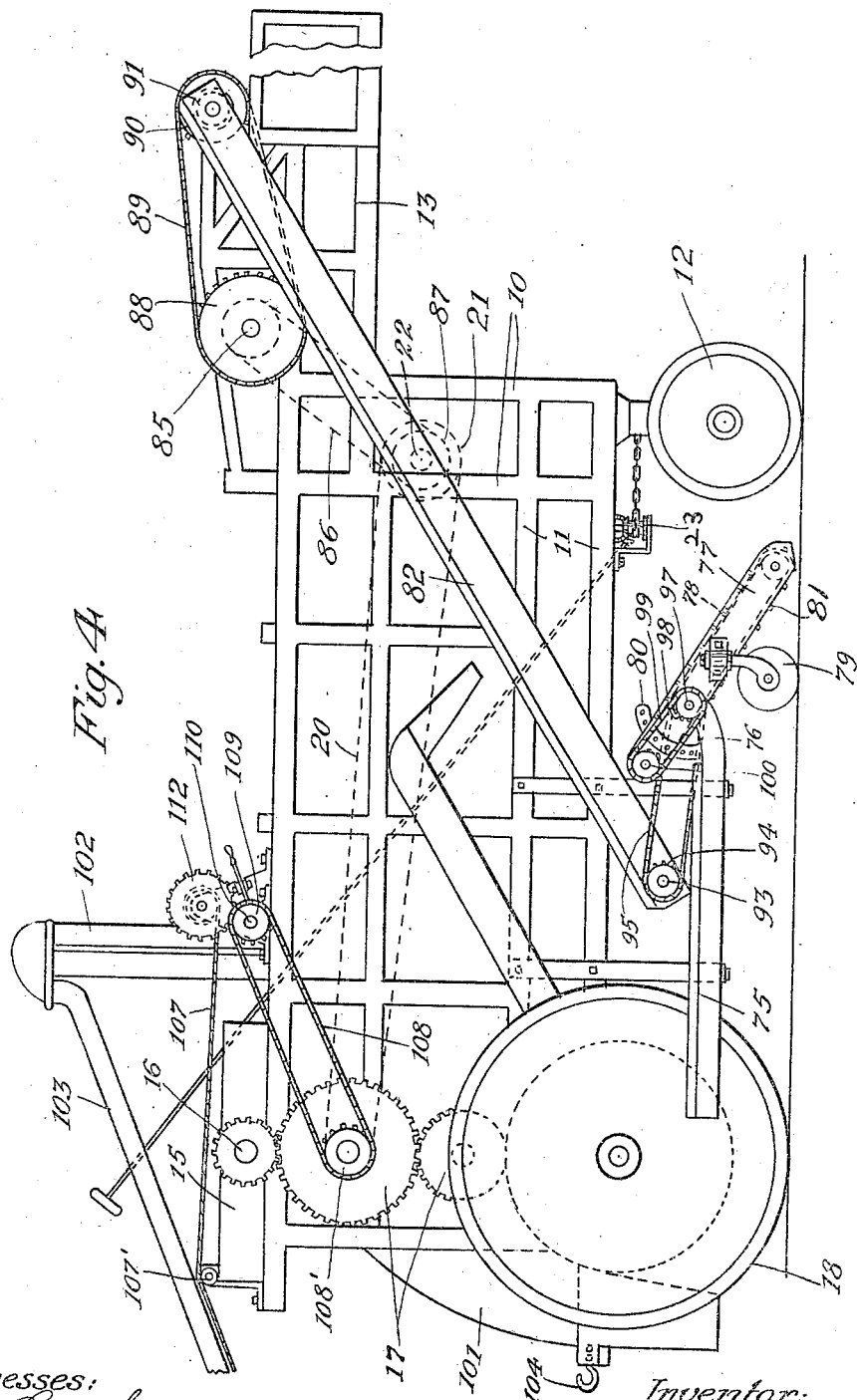

The separator frame is formed of uprights 10 and longitudinal members 11 in a well known manner, and is supported in front upon a steering truck 12 of common construction. The separating mechanism itself will be of any of the well known types in use and forms no part of my invention, a front feeder 13 being shown in Figs. 3 and 4 and a deck feeder 14 in Figs. 1 and 2, either or both of which may be of common construction and do not in themselves form any part of my invention. A motor of explosive engine type is indicated diagrammatically at 15, it being intended to use a motor of the horizontal opposed cylinder type, although it is obvious other forms of motor will fall equally within the scope of my invention. The crank shaft 16 is connected by suitable gearing 17 with the gear wheels 18 of the separator which are larger and wider than rear separator wheels as ordinarily employed, being in fact modified traction engine wheels. Suitable clutching mechanism (not shown) for disconnecting, reverse and change speed is employed and may be of any of the well known types employed for that purpose. A pulley 19 is connected by belt 20 with the pulley 21 on shaft 22 on which is mounted the threshing cylinder of the separator and which, as is usual, is the main power shaft from which the various elements of the separator are driven. As these features form no part of my invention, the details of the separator mechanism and the driving mechanism therefor have been largely omitted from the drawings. When the side form of shock loader is employed as shown in Figs. 3 and 4, the separator will be steered directly by the oscillation of the front truck 12 of the separator through steering mechanism 23 provided for that purpose. In the preferred form of my invention shown in Figs. 1 and 2, the steering truck 12 has rigidly secured thereto a tongue or beam 24, and upon the outer end of said tongue is mounted a casting 25 pivoted to oscillate in a vertical plane, said casting carrying a cross bar 26 preferably of the form indicated in dotted lines in Fig. 1, at the outer ends of which are journaled so as to swing on vertical axes wheels 27. Each of said wheels is provided with an arm 28, said arms 28 being pivotally connected to move in unison by means of a link 29. Cables 30 and 31 extend in opposite directions around sheaves 32 and 33, being guided beneath the truck 12 by other sheaves 34 and passing around a drum 35 so that said cables 31 and 30 go respectively to opposite sides of the drum. The drum may be operated by a worm 36 on a rod 37 having a hand wheel 38 on the end thereof conveniently positioned to be manipulated by the operator. By the above indicated means, it will be seen that the wheels 27 are mounted for independent oscillation in a vertical plane relative to the tongue 24 but will through operation of the steering mechanism, just described, oscillate said tongue and through it the front truck 12 of the separator, by which the entire apparatus may be steered. Upon each end of the cross bar 26 brackets 39 are provided, and pivoted in said brackets by means of sleeve trunnions 40 is a frame 41 having a continuous floor 42 over which is adapted to travel an endless conveyer 43 which runs over rollers 44 and 45 journaled in the ends of said frame.

Upon the tongue 24 is rigidly constructed a platform 46 and extending upwardly from adjacent one side of said platform is a carrier trough 47, said trough extending above a slideway or chute 48 running down to the conveyer 49 of the feeder. The conveyer 49 is driven from the cylinder shaft 22 by means of a sprocket chain 50 running from sprocket wheel 51 to a sprocket wheel 52 on a shaft 53 upon which is mounted the roller for driving the conveyer 49. The shaft 53 has thereon a spur gear 54 in mesh with a spur gear 55 on a short shaft 56 upon which is a sprocket connected by a sprocket chain 57 with a sprocket wheel 58 on a roller 59 journaled at the end of trough 47. The roller 53 drives an endless conveyer 60 which travels in the conveyer trough 47 and extends around roller 59 and another roller 61 journaled in the lower end of the conveyer trough 47. On the shaft 62 of the roller 61 is a sprocket wheel 63 from which extends a sprocket chain 64 to a sprocket wheel 65 on a shaft 66 extending through bearings in the aforesaid trunnions 40. Upon the other end of shaft 66 is a sprocket wheel 67 over which runs a sprocket chain 68 driving a sprocket wheel 69 on a shaft 70 upon which the front roller 45 is mounted.

By this means, frame 41 and loader platform 42 is mounted for free relative movement transversely in a vertical plane at right angles to tongue 24 upon casting 25 and for free movement longitudinally or parallel to tongue 24 about trunnions 40 although the carrier 43 thereon is constantly driven by the means above described. When in use, the lower end of frame 41 is supported at the proper distance from the ground by means of caster wheels 71, and due to the flexibility above stated, it may travel comparatively close to the ground and will follow the variations of the surface accurately and safely. When the frame 41 is not in use, it will be lifted parallel with platform 46 and locked in that position by means of a key 72 engaging in apertures 73 on side brackets 74 provided for that purpose.

In the form of my invention illustrated in Figs. 3 and 4 which may be used to advantage with certain types of front self feeders, a platform 75 is rigidly secured to the frame of the separator, extending out the proper distance to one side thereof. Upon the forward end of platform 75 are secured upwardly curved bracket members 76 between which is journaled a frame member 77 having a conveyer platform 78 in all respects similar to frame 41 and platform 42. The frame 77 is supported at the proper distance from the ground, when in operation, by means of caster wheels 79 and is held up in inoperative position by locking the same to brackets 80 provided for the purpose. Upon the platform 78 an endless conveyer 81 is mounted to travel, and extending upwardly adjacent platform 75 and between that and the separator, to the frame of which it is rigidly secured, is a conveyer trough 82, the upper end of which overlies a sloping platform 83 which extends to the conveyer 84 of the front feeder 13. This conveyer 84 and the feeder mechanism is operated from a shaft 85 driven by a sprocket chain 86 extending from a sprocket wheel 87 on the main power shaft 22. On the shaft 85 is a sprocket wheel 88 which, through sprocket chain 89, drives a sprocket wheel 90 and through that a roller 91 journaled at the upper end of conveyer trough 82. The roller 91 drives an endless conveyer 92 traveling in conveyer trough 82 and extending around a roller 93 journaled in the bottom thereof. The shaft of the roller 93 is provided with a sprocket wheel 94 which through a sprocket chain 95 and sprocket wheel 96 drives a shaft 97 extending centrally through the pivotal supports of frame 77. The shaft 97 has on the end thereof a sprocket 98 which, through a sprocket chain 99 and sprocket wheel 100 on the shaft thereof, drives the roller journaled in the upper end of platform 77 over which the conveyer 81 extends and by which said conveyer is continuously driven.

It will be obvious that whichever form of my invention is used the essential features of its operation are the same, except that in the form shown in Figs. 1 and 2 the mechanism for picking up the shocks operates directly to steer the entire machine. The engineer will occupy a position upon the top of the machine back of the feeder mechanism and will control the engine and steer the machine. A second man will stand either upon the platform 46 or upon the platform 75. As the machine is driven over the ground by the traction means employed, the end of conveyer 43 or conveyer 81 will be successively brought against the shocks along a given line or row down the field. These shocks or the bundles composing them will be picked up and delivered by the conveyer upon platform 46 or platform 75. The man on the platform will lay the bundles within the conveyer trough 47 or the conveyer trough 82, and the endless conveyers therein will carry them either to the slide platform 48 or the slide platform 83 down which they will travel to the feeder conveyer to be taken care of by the machine in the usual way. In practice, the separator will probably not have as large capacity as the larger machines employed for stack threshing, since the small number of men employed necessary to operate it will not make it desirable to use a machine of large size. As the man on the platform will have to move the bundles but a short distance to the carrier, it will be easily practicable for one man to handle the bundles as rapidly as they are brought upon the platform by the loader conveyer. The straw may be blown out upon the ground through a hooded chute 101 and will spread over the ground without causing a great amount of dust, and will be constantly left behind as the machine progresses through the field. The threshed grain will be taken up into an elevator 102 of well known construction from which it will run back through spout 103 into a grain tank drawn behind the separator and attached thereto by means of hook 104 on cross-bar 105 back of the separator. In practice it will be desirable to have a number of such grain tanks available and as they are brought back from the elevator, the team will be unhitched from the empty tank and hitched on to the full tank. To bring the empty tank up into position where the same may be connected to the hook 104, I have provided a drum 106 mounted upon top platform from which a cable 107 extends over a sheave 107'. The drum is driven in any desired manner. As shown a sprocket chain 108 runs from a sprocket wheel 108' on a driven shaft of the machine to a sprocket wheel 109 on a shaft 110 having loose thereon a spur gear 111 meshing with a gear 112 having connection with the drum 106. By means of a clutch 113 and clutch lever 114 power may be applied to rotate the drum 106 as desired. Also the drum 106 may be provided with gearing 115 operated by a removable hand crank 116.

The operation of my device has been fully given. The shock lifting mechanism is similar to that employed in devices for loading shocks upon wagons and is entirely practicable. The shocks are lifted bodily and carried upon the platform from which they are transferred by hand and one at a time to the proper conveyer mechanism. If at any time the shocks should come up so rapidly as to get ahead of the man on the platform, the engineer can unclutch the mechanism for operating the traction and the machine will simply remain stationary but continuously running until the operator has cleared off the platform when the engineer will again drive the machine forward to take up more shocks. One of the material advantages of my machine is that owing to the small crew necessary to operate it, it is not essential that the machine be made of extremely large capacity and, therefore, it can be economically constructed so as to be moderate in size and cost. Also the farmer who has one helper or son large enough to manipulate the steering apparatus will be able to thresh his grain without being dependent upon a large amount of outside labor which is always expensive and difficult to get during the harvest period.

I claim:

1. In combination, a traveling threshing machine, a platform extending outwardly from the threshing machine, means for lifting shocks from the ground and depositing the same on the platform, and means for conveying the bundles from the platform to the threshing machine mechanism, said platform providing a support and working space movable with the threshing machine for an operator to effect transference of bundles singly from the point of delivery upon the platform to said conveying means.

2. In combination, a traveling threshing machine, a platform, a conveyer frame pivotally mounted in front of said platform having the lower end thereof in close proximity to the ground and the upper end overlying said platform, an endless conveyer on said frame, a self-feeder on the threshing machine having an endless conveyer, a sloping platform extending to the feeder conveyer, an endless carrier extending from the first named platform above the sloping platform, said first-named platform providing a support and working space movable with the threshing machine for an operator to effect transference of bundles singly from the point of delivery upon the platform to said endless carrier, and means to drive the carrier and first-named conveyer from the threshing machine.

3. In combination, a traveling threshing machine, a platform, means for lifting the shocks from the ground and depositing the same on the platform, a self-feeder on the threshing machine having an endless conveyer, a sloping platform extending to the conveyer, an endless carrier extending from the first-named platform above the sloping platform, said first-named platform providing a support and working space movable with the threshing machine for an operator to effect transference of bundles singly from the point of delivery upon the platform to the conveyer, and means to drive the carrier and first-named conveyer from the threshing machine.

4. In combination, a traveling threshing machine, a platform extending outwardly from the threshing machine, means for lifting the shocks from the ground and depositing the same on the platform, a self-feeder on the threshing machine, a chute sloping downwardly to the self-feeder, and means for conveying bundles from the platform and delivering them to the chute, said platform providing a support and working space movable with the threshing machine for an operator to effect transference of bundles singly from the point of delivery upon the platform to the conveying means.

5. In combination, a traveling threshing machine, a platform extending outwardly from the threshing machine, a conveyer pivotally mounted in front of said platform and supported so that one end overlies the platform and the other is adjacent to the ground, a self-feeder on the threshing machine, a chute sloping downwardly to the feeder, an endless carrier running from said platform to a point above said chute, said platform providing a support and working space movable with the threshing machine for an operator to effect transference of bundles singly from the point of delivery upon the platform to the carrier, means to drive the carrier from the feeder, and means to drive the conveyer from the carrier.

6. In combination, a traveling threshing machine, a platform extending forwardly directly ahead of the threshing machine, a deck feeder on the threshing machine, a slideway or chute sloping downwardly to the feeder, means for lifting the shocks of bundles from the ground and depositing them upon the platform, and means for conveying bundles from the platform and discharging them upon said slideway, said platform providing a support and working space movable with the threshing machine for an operator to effect transference of bundles singly from the point of delivery upon the platform to the conveying means.

7. In combination, a traveling threshing machine, a platform extending outwardly from the threshing machine, a conveyer frame pivotally mounted in front of said platform and having the lower end thereof in close proximity to the ground and the upper end overlying said platform, an endless conveyer on said frame for engaging and lifting the shocks bodily and depositing them upon the platform, and means for conveying the bundles from the platform to the threshing machine mechanism, said platform providing a support and working space movable with the threshing machine for the reception of said shocks and for an operator to effect transference of bundles singly from the shocks upon the platform to said conveying means.

8. In combination, a traveling threshing machine, a platform extending outwardly from the threshing machine, means for lifting shocks from the ground and depositing the same upon the platform, a self-feeder on the threshing machine having an endless conveyer, and means for conveying the bundles from the platform and delivering the same to said feeder conveyer, said platform providing a support and working space movable with the threshing machine for the reception of said shocks and for an operator to effect transference of bundles singly from the shocks upon the platform to said conveying means.

9. In combination, a traveling threshing machine, a platform extending outwardly from the threshing machine, means for lifting shocks from the ground and depositing the same upon the platform, a self-feeder on the threshing machine, and an endless carrier extending from a point close to the upper surface of said platform to a point above said self-feeder for conveying bundles from the platform and delivering them to the self-feeder, said platform providing a support and working space movable with the threshing machine for the reception of said shocks and for an operator to effect transference of bundles singly from the shocks upon the platform to said endless carrier.

In testimony whereof I affix my signature in presence of two witnesses.

EDWIN M. WHEELOCK.

Witnesses:
R. H. JACOBSON,
H. A. BOWMAN.

Copies of this patent may be obtained for five cents each, by addressing the "Commissioner of Patents, Washington, D. C."